(12) United States Patent
Wang et al.

(10) Patent No.: US 8,054,531 B2
(45) Date of Patent: Nov. 8, 2011

(54) MICRO-ELECTRO-MECHANICAL SYSTEMS AND PHOTONIC INTERCONNECTS EMPLOYING THE SAME

(75) Inventors: Shih-Yuan Wang, Palo Alto, CA (US); R. Stanley Williams, Redwood City, CA (US); Terrel L. Morris, Garland, TX (US); Mihail Sigalas, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1169 days.

(21) Appl. No.: 11/823,336

(22) Filed: Jun. 26, 2007

(65) Prior Publication Data
US 2009/0003836 A1    Jan. 1, 2009

(51) Int. Cl.
G02B 26/00 (2006.01)
H04B 10/00 (2006.01)
(52) U.S. Cl. .................................. 359/291; 398/156
(58) Field of Classification Search ............. 359/290, 359/291, 846, 847; 372/20, 99, 102; 398/84, 398/87, 156
See application file for complete search history.

(56) References Cited

U.S. PATENT DOCUMENTS

| 6,666,559 B2 * | 12/2003 | Kaneko | 359/846 |
| 2006/0239324 A1 * | 10/2006 | Akagawa et al. | 372/99 |

FOREIGN PATENT DOCUMENTS

| JP | 2004-282013 | 10/2004 |
| JP | 2005-331880 | 12/2005 |
| JP | 2007-108791 | 4/2007 |

OTHER PUBLICATIONS

International Search Report; PCT Patent Application No. PCT/US2008/007933, filed Jun. 25, 2008; search issued by Korean Patent Office (ISA) Dec. 18, 2008.
Berger, J.D. et al., "Tunable MEMS devices for optical networks", Optics and Photonics News, 14(3), Mar. 2003.
Liu et al., "Micro-optp-mechanical grating switch", Sensors and Actuators, 86, Oct. 2000.
Xie et al., "Integrated parylene electrostatic peristaltic pump", In: 7th Int'l Conference on Miniaturized Chemical and Biochemical Analysis Systems, Proceeding of Micro-TAS 2003.
Wagner et al., "Bistable microvalve with pneumatically coupled membranes", In: Micro Electro Mechanical Systems, MEMS Proceedings, Feb. 1996.
Gross, M., et al., "Board-to-Board optical interconnects using a parabolic mirror for high angular misalignment tolerance", Optical Society of America, 2003, vol. 90, pp. 26-28.
Tormen, Maurizio et al., "Deformable MEMS grating for wide tunability and high operating speed", Journal of Optics, 2006, pp. S337-S340.

(Continued)

*Primary Examiner* — Alessandro Amari

(57) ABSTRACT

Various embodiments of the present invention are directed to micro-electro-mechanical systems and photonic interconnects employing micro-electro-mechanical systems. One micro-electro-mechanical system embodiment of the present invention includes a lens structure and an actuator. The lens structure includes a substantially transparent membrane having a flexible, curved surface, and a reservoir holding fluid that is fluidly coupled to the membrane. The actuator system is operably coupled to the reservoir in order to exert pressure on the fluid to change the curvature of the membrane and the focal point of the lens structure.

12 Claims, 15 Drawing Sheets

OTHER PUBLICATIONS

Kraft, M., et al., "Hand-held high-speed spectrometers based on Micro-Electro-Mechanical components", Proceedings of the Symposium on Photonics Technologies for 7th Framework Program, Oct. 12-14, 2006, pp. 183-186.

Sotom, Michel, et al., "High-Throughput optical Interconnect Technology for Future On-Board Digital Processors", (2005).

Bloom, D.M., et al., "The Grating Light Valve: revolutionizing display technology", Silicon Light Machines, (1995).

Bhalotra, S.R., et al., "Parallel-plate MEMS Mirror Design for Large On-resonanace Displacement", Edward L. Ginzton Laboratory, Stanford University, (2000).

* cited by examiner

MICRO-ELECTRO-MECHANICAL SYSTEMS AND PHOTONIC INTERCONNECTS EMPLOYING THE SAME

TECHNICAL FIELD

Embodiments of the present invention are directed to micro-electro-mechanical systems and photonic interconnects, and, in particular, to micro-electro-mechanical systems and photonic interconnects employing micro-electro-mechanical systems to dynamically focus and align data encoded electromagnetic radiation.

BACKGROUND

Distributed computing is a computer-processing method in which a single computational task is partitioned into a number of computational tasks that can be run simultaneously and separately on nodes of a distrubuted computing platform ("DCP"). A node can be a server, a computer, memory, a peripheral device or any other data processing and/or storage device. The computer may include one or more memory devices and one or more processors. In order to distribute data between nodes, the nodes are typically interconnected via high-speed, low latency, electrical interconnections to a switch, which is used to transmit data between nodes. FIG. 1 shows a schematic representation of an 8-node DCP 100. DCP 100 comprises nodes 102-109 and a switch 110. Nodes 102-109 are arranged into two columns, and are electronically interconnected to switch 110 via data-transmission cables, such as Ethernet cables. Nodes 102-109 can be stored in one or more racks or cabinets (not shown) and use switch 110 to forward packets of data between nodes 102-109 for processing. For example, switch 110 can be used to transmit data generated by node 104 to nodes 103 and 107 for further processing.

In general, DCPs are efficient computing platforms for parallel-processing applications. However, typical DCPs are inefficient energy consuming devices. In particular, metal wires are often used to interconnect nodes and node components, and much of the energy needed to transmit electrical signals over the metal wires is dissipated as heat. For example, approximately 80-90% of the electrical energy needed to transmit signals over Cu wires is dissipated as heat. In order to prevent this heat from building up and causing irreparable damage to node components, wires, and other electrical interconnects, DCPs are typically located in air conditioned rooms, and each node may include one or more fans that circulate air over node components and circuit board wires. However, the energy needed to cool DCPs only adds to the total amount of energy needed to operate DCPs. Manufacturers, designers, and users of DCPs have recognized a need for interconnects that provide high bandwidth, high-speed interconnections between nodes and node components and use less energy and generate less heat than conventional electrical interconnects used in typical DCPs.

SUMMARY

Various embodiments of the present invention are directed to micro-electro-mechanical systems and photonic interconnects employing micro-electro-mechanical systems. One micro-electro-mechanical system embodiment of the present invention includes a lens structure and an actuator. The lens structure includes a substantially transparent membrane having a flexible, curved surface, and a reservoir holding fluid that is fluidly coupled to the membrane. The actuator system is operably coupled to the reservoir in order to exert pressure on the fluid to change the curvature of the membrane and the focal point of the lens structure.

DETAILED DESCRIPTION

Various embodiments of the present invention are directed to micro-electro-mechanical systems and photonic interconnects employing micro-electro-mechanical systems. The photonic interconnects can be used to replace certain electrical interconnects between nodes of a DCP and replace certain electrical interconnects between components of a node. The photonic interconnects may provide higher bandwidth and higher-speed interconnections between nodes and node components and use less energy and generate less heat than conventional electrical interconnects.

Information generated by a processor or extracted from memory of a node is encoded in a beam of electromagnetic radiation referred to as a "data-carrying beam." The photonic interconnects of the present invention employ micro-electro-mechanical systems to direct the data-carrying beam to a receiver located on either a different node within a DCP or to a receiver located on a component within the same node. The receiver includes a photodetector that converts the data-carrying beam into electrical or electromagnetic radiation signals that can be processed by the node. The micro-electro-mechanical systems of the present invention can dynamically align and focus a data-carrying beam onto a corresponding photodetector.

Figure 1:
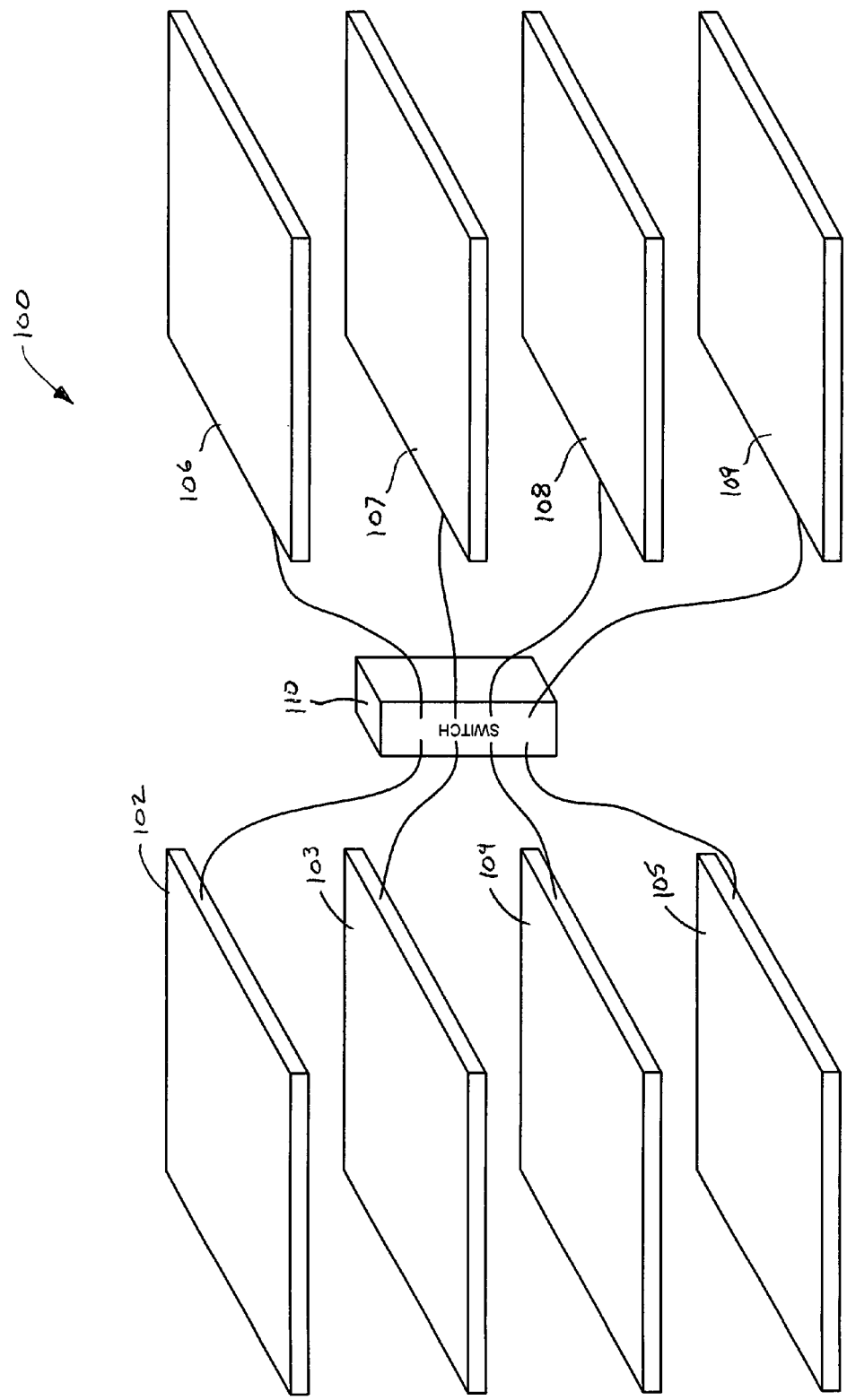
FIG. 1 shows a schematic representation of an 8-node distrubuted computing platform.
Figure 2:
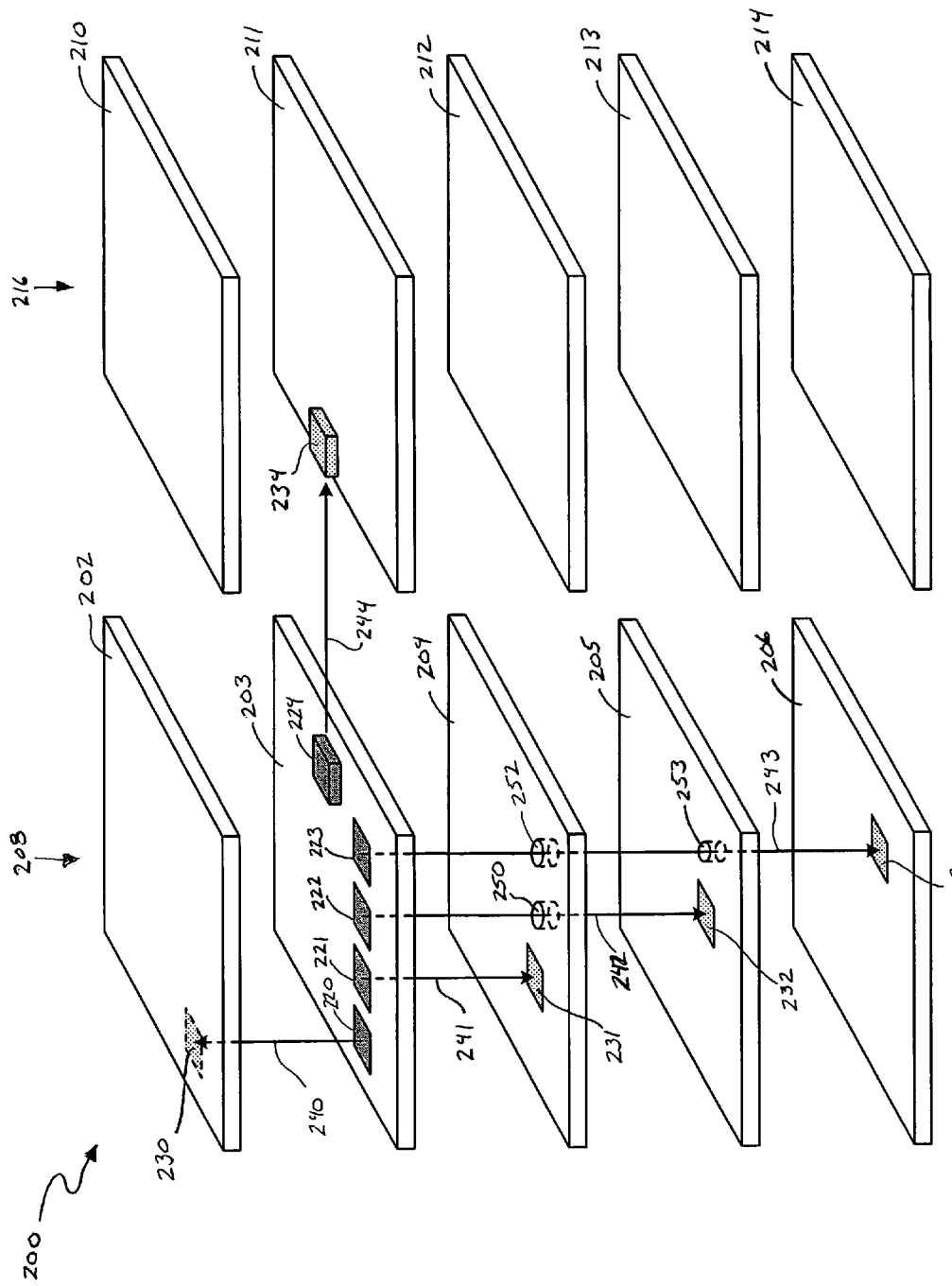
FIG. 2 shows a schematic representation of a 10-node distributed computing platform including photonic interconnects in accordance with embodiments of the present invention.

FIG. 2 shows a schematic representation of a 10-node DCP 200 including photonic interconnects in accordance with embodiments of the present invention. The DSP 200 comprises nodes 202-206 arranged in a first column 208 and nodes 210-214 arrange in a second column 216. Nodes 202-206 and 210-214 can be stored in one or more racks or cabinets (not shown). Each node within a column can be in photonic communication with other nodes in the same column and in photonic communication with certain nodes in an adjacent column via photonic interconnect embodiments of the present invention. Photonic interconnect embodiments of the present invention include a micro-electro-mechanical system ("MEMS") located on a first node and a receiver located on a second node. For example, as shown in FIG. 2, node 203 is in photonic communication with nodes 202 and 204-206 in the first column 208 and in photonic communication with adjacent node 211 in the second column 216 via five photonic interconnects. The five photonic interconnects comprise five MEMS 220-224 all of which are located on node 203 and five corresponding receivers 230-234 located on nodes 202 and 204-206 in the first column and adjacent node 211 in the second column 216. Embodiments for MEMS 220-224 are described in greater detail below with reference to FIGS. 6 and 17. Node 203 generates data in the form of data-carrying beams 240-244 that are transmitted to nodes 202, 204-206, and 211 for further processing. MEMS 220 is configured to direct data-carrying beam 240 to receiver 230, which is located on the underside of node 202, and MEMS 221 is configured to direct data-carrying beam 241 to receiver 231. Node 204 includes an aperture 250 so that MEMS 222 can direct data-carrying beam 242 unobstructed to receiver 232 located on non-adjacent node 205. Node 204 includes an aperture 252 and node 205 also includes an aperture 253 so that MEMS 223 can direct data-carrying beam 243 unobstructed to receiver 233 located on non-adjacent node 206. MEMS 224 is configured to horizontally direct data-carrying beam 244 to receiver 234.

The size of the apertures used to permit transmission of a data-carrying beam between non-adjacent nodes increases with closer proximity to the node generating the data-carrying beam. For example, aperture 252 is larger than aperture 253. The apertures can be round, elliptical, square, rectangular, or any other shape that is suitable for unobstructed transmission of a data-carrying beam through a node. Note that the photonic interconnects in DCP may not replace all of the electrical interconnects between nodes. In other words, photonic interconnects of the present invention may be used to replace only certain electrical interconnects. For example, as shown in FIG. 2, DCP 200 may also includes a switch (not shown) that provides transmission of certain data-carrying electrical signals over electrical interconnects between nodes.

Figure 3B:
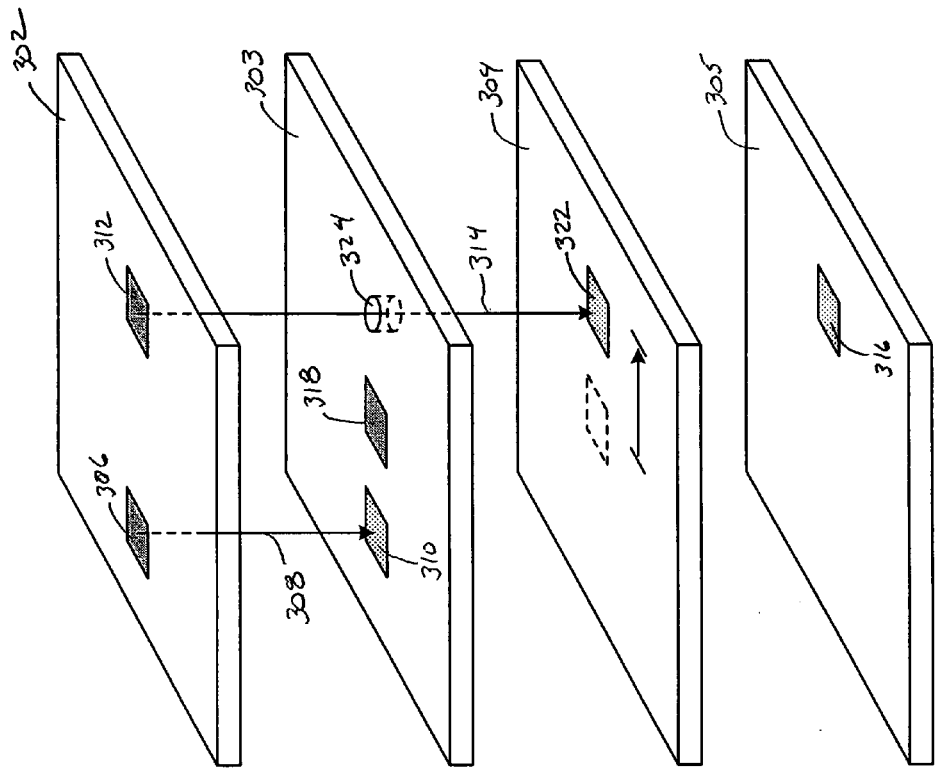
FIGS. 3A-3B show a schematic representation of a 4-node distributed computing platform in which a receiver is operable to detect data-carrying beams of electromagnetic radiation generated by two different nodes at different times in accordance with embodiments of the present invention.
Figure 3A:
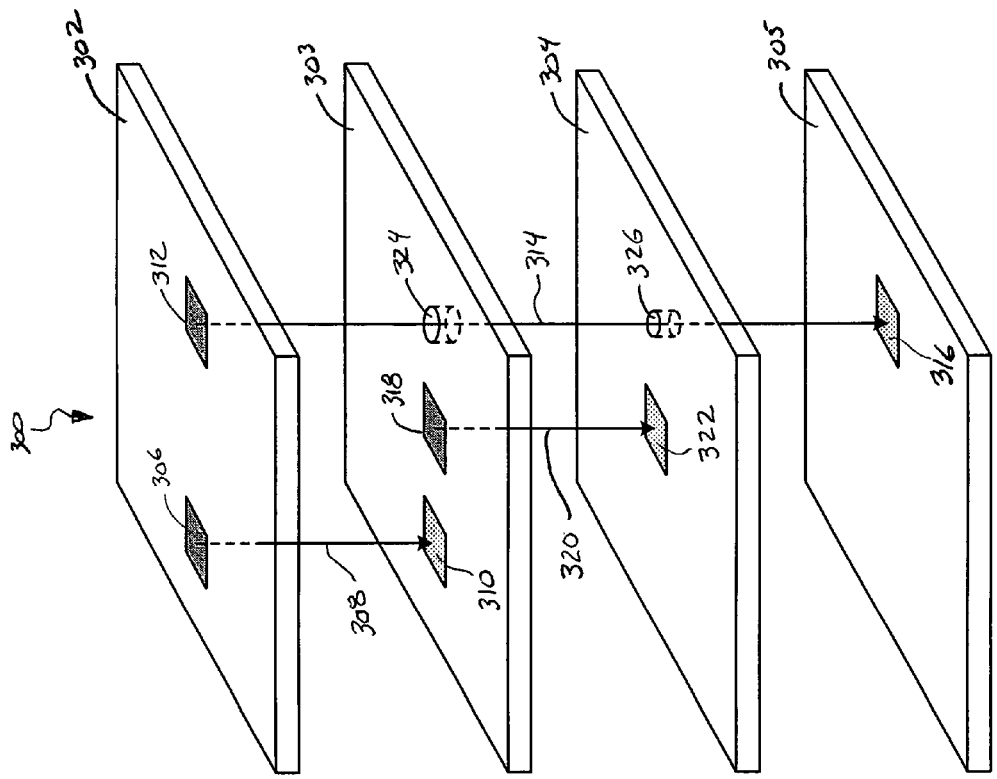

In other embodiments of the present invention, the receivers can be electronically coupled to motors, such as piezoelectric motors, that are operable to reposition receivers to intercept data-carrying beams generated by different nodes at different times. FIGS. 3A-3B show a schematic representation of a 4-node DCP 300 in which a receiver can be repositioned in order to detect data-carrying beams generated by two different nodes at different times in accordance with embodiments of the present invention. As shown in FIG. 3A, DCP 300 includes a column of four nodes 302-305. Node 302 includes a MEMS 306 and a MEMS 312. MEMS 306 directs a first data-carrying beam 308 to a receiver 310 located on node 303, and MEMS 312 directs a second data-carrying beam 314 to a receiver 316 located on node 305. Node 303 includes a MEMS 318 that directs a third data-carrying beam 320 to a receiver 322 located in a first position on node 304. Initially, as shown in FIG. 3A, the second data-carrying beam 314 passes unobstructed through an aperture 324 in node 303 and an aperture 326 in node 304 to reach receiver 316. However, at a later time, as shown in FIG. 3B, when node 303 is no longer transmitting data to node 304 and node 302 needs to transmit data to node 304 instead of node 305, receiver 322 can be repositioned via a motor (not shown) operably coupled to receiver 322 to intercept data-carrying beam 314.

Figure 4:
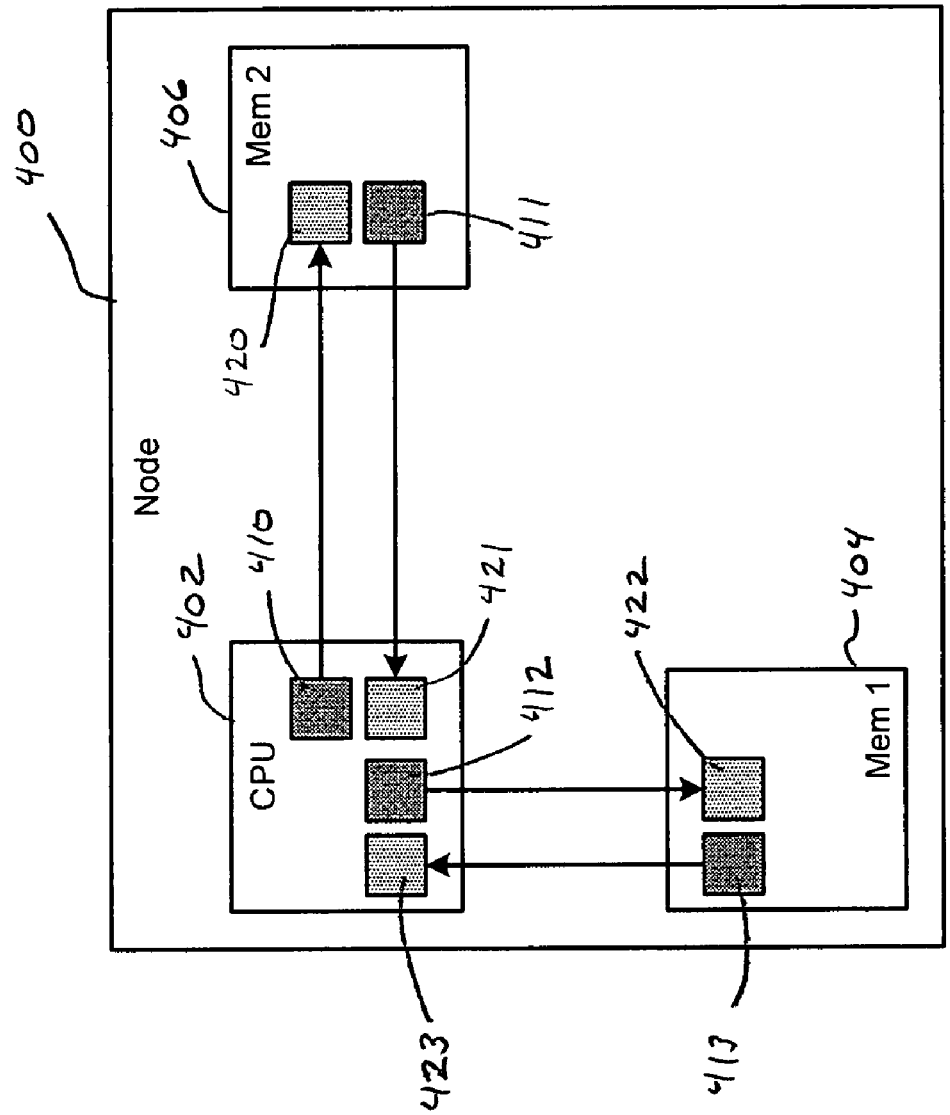
FIG. 4 shows a node with photonic interconnects located on node components for on-board photonic communication in accordance with embodiments of the present invention.

In other embodiments of the present invention, photonic interconnects of the present invention can be used to transmit information between components of a single node rather than using electrical signals lines of an electronic bus. FIG. 4 shows a node 400 with photonic interconnects located on node components for on-board photonic communication in accordance with embodiments of the present invention. Node 400 includes a central-processing unit ("CPU") 402, a first memory device 404, and a second memory device 406. Other components of node 400 are not shown for simplicity of illustration. Memory devices 404 and 406 can be one of many different types of random access memory devices that are well-known in the art. As shown in FIG. 4, CPU 402 is in photonic communication with memory devices 404 and 406 via four photonic interconnects. The first photonic interconnect comprises MEMS 410 and receiver 420, the second photonic interconnect comprises MEMS 411 and receiver 421, the third photonic interconnect comprises MEMS 412 and receiver 422, and the fourth photonic interconnect comprises MEMS 413 and receiver 423. These four photonic interconnects are used to transmit data-carrying beams between CPU 402 and first memory device 422 and between CPU 402 and second memory device 406 rather than using electrical signal lines of an electronic bus.

In the follow discussion, the terms "computational devices" refers to nodes and node components. As described above with reference to FIGS. 2-4, in order to transmit a data-carrying beam from a first computational device to a second computational device, a photonic interconnect comprises a MEMS located on the first computational device and a receiver located the second computational device. However, certain computational devices may be perturbed during operation. For example, in certain DCPs, a node can have a vibrational displaced of approximately 100 microns during operation. These vibrational displacements may over time place data-carrying beams out of alignment with photodetectors located on corresponding receivers which, in turn, may interrupt the transmission of data between nodes. In accordance with embodiments of the present invention, photonic interconnects include systems that dynamically align and focus data-carrying beams output from a first computational device onto photodetectors located on a second computational device.

Figure 5A:
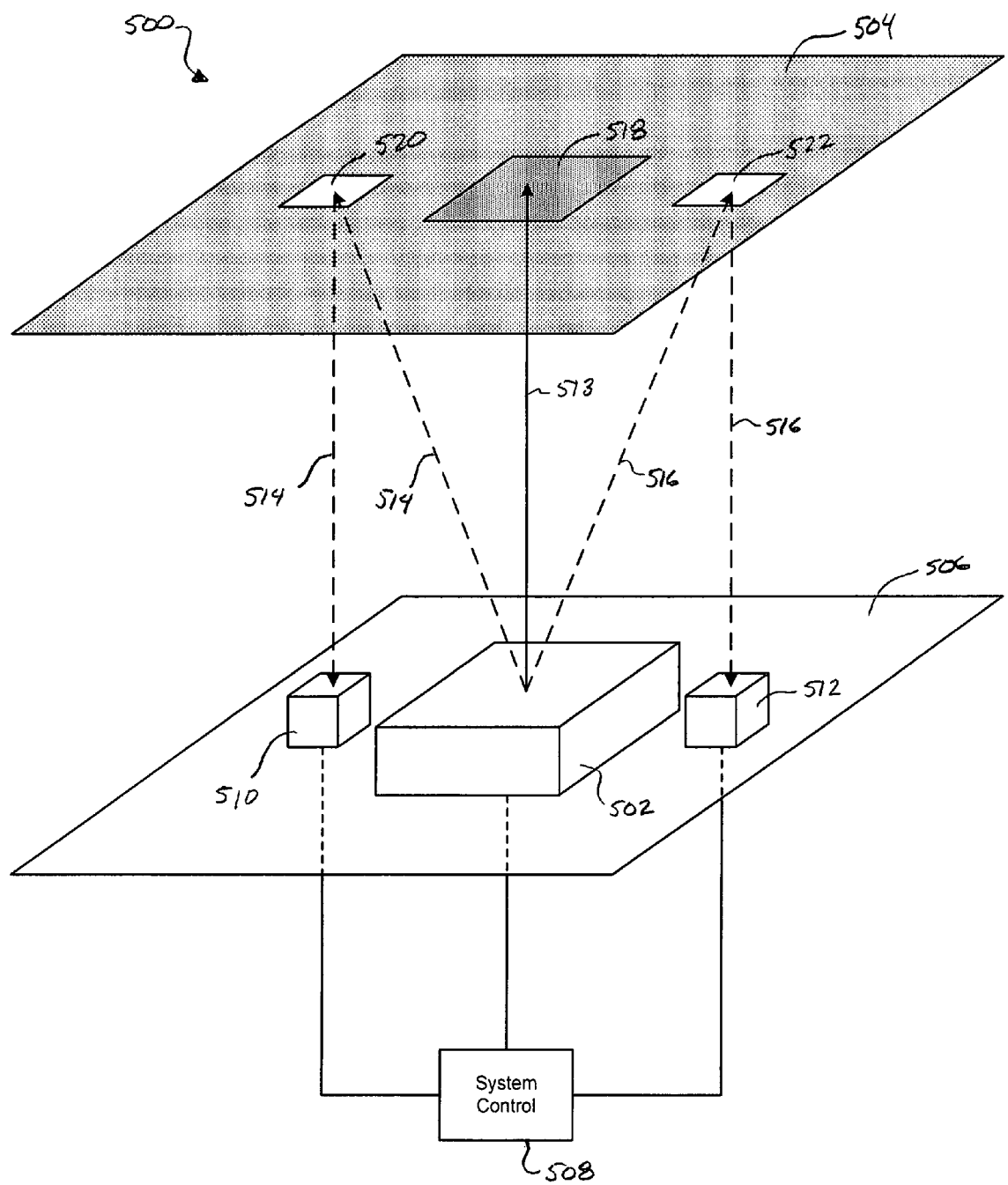
FIGS. 5A-5B show two kinds of photonic interconnects, each photonic interconnect represents an embodiment of the present invention.
Figure 5B:
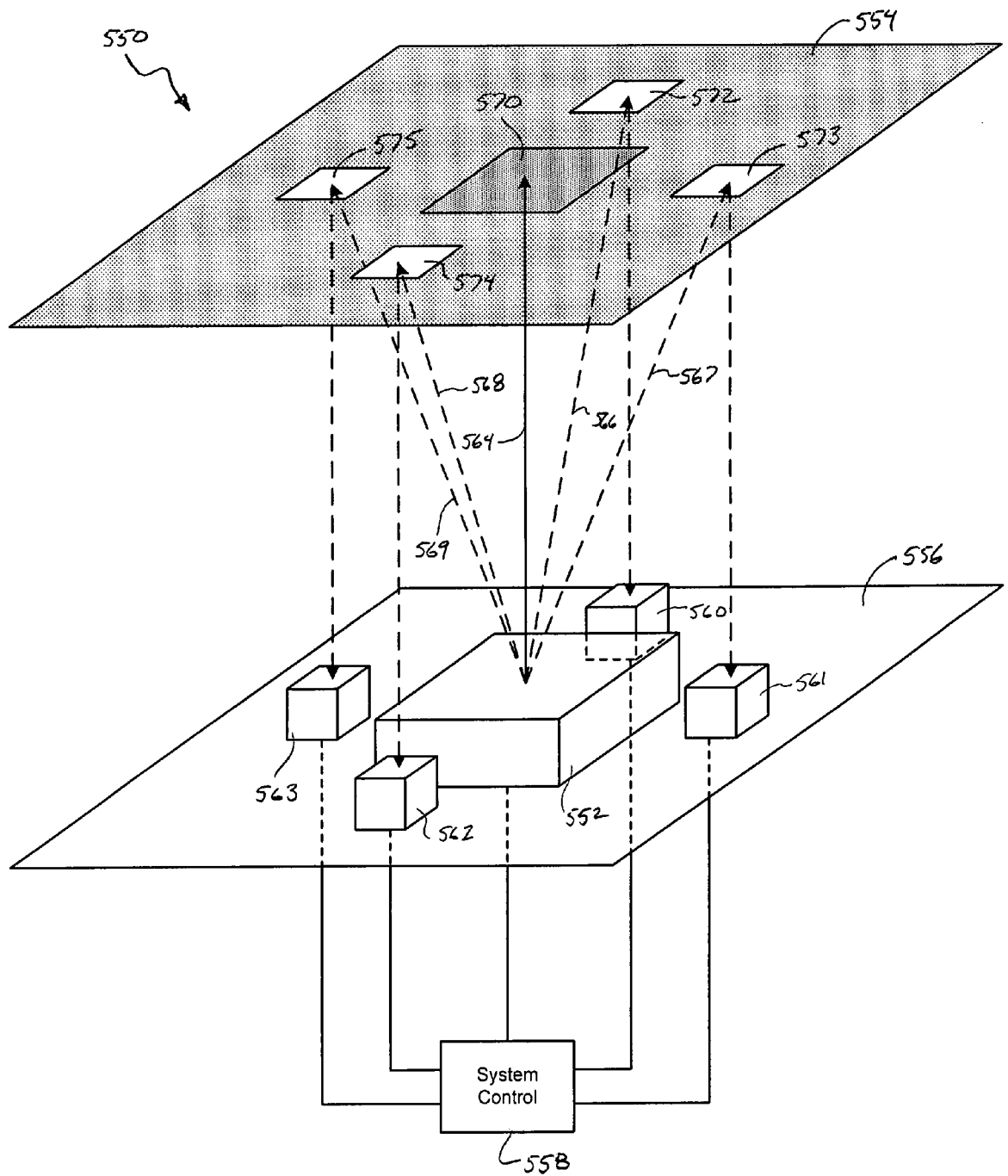

FIGS. 5A-5B show two kinds of photonic interconnects, each photonic interconnect represents an embodiment of the present invention. In FIG. 5A, a first photonic interconnect 500 includes a MEMS 502 and a receiver 504. MEMS 502 can be located on a first computational device 506 and is in electrical communication with a system control 508 that can be located in the first computational device 506. Two photodetectors 510 and 512 are positioned on opposite sides of MEMS 502 and are also in electrical communication with system control 508. MEMS 502 directs a data-carrying beam 513 output from the first computation device 506 and two alignment beams 514 and 516 to receiver 504. Receiver 504 includes a photodetector 518 and two reflectors 520 and 522 located on opposite sides of photodetector 518. Photodetector 518 detects data-carrying beam 513 and converts the data-encoded electromagnetic radiation into a data-carrying signal that can be processed by a second computational device (not shown). Reflectors 520 and 522 are positioned to reflect alignment beams 514 and 516 back to photodetectors 508 and 510, respectively. Alignment beams 514 and 516 are used to determine whether node vibrations, or some other perturbations, have moved data-carrying beam 513 out of alignment with photodetector 518. When either or both alignment beams 514 and 516 are not detected by photodetectors 508 and 510, respectively, system control 508 may respond by transmitting signals to MEMS 502 that bring data-carrying beam 513 and alignments beams 514 and 516 back into alignment with photodetectors 518, 508, and 510, respectively.

In FIG. 5B, a photonic interconnect 550 includes a MEMS 552 and a receiver 554. MEMS 552 is located on a first computational device 556 and is in electrical communication with a system control 558. Rather than using two photodetectors to detect misalignments as described above with reference to FIG. 5A, four photodetectors 560-563 are positioned around MEMS 552 and are also in electrical communication with system control 558. MEMS 552 directs a data-carrying beam 564 output from first computation device 556 and four alignment beams 566-569 to receiver 554. Receiver 554 includes photodetector 570 and four reflectors 572-575 located around photodetector 570. Photodetector 570 detects data-carrying beam 564 and converts the electromagnetic radiation into a data-carrying signal that may be processed by a second computational device (not shown). Reflectors 572-575 are positioned to reflect alignment beams 566-569 back to photodetectors 560-563, respectively. When one or more of alignment beams 566-569 are not detected by photodetectors 560-563, respectively, system control 558 responds by transmitting signals to MEMS 552 in order to bring data-carrying beam 564 and alignments beams 566-569 back into alignment with photodetectors 570 and 560-563, respectively.

Figure 6:
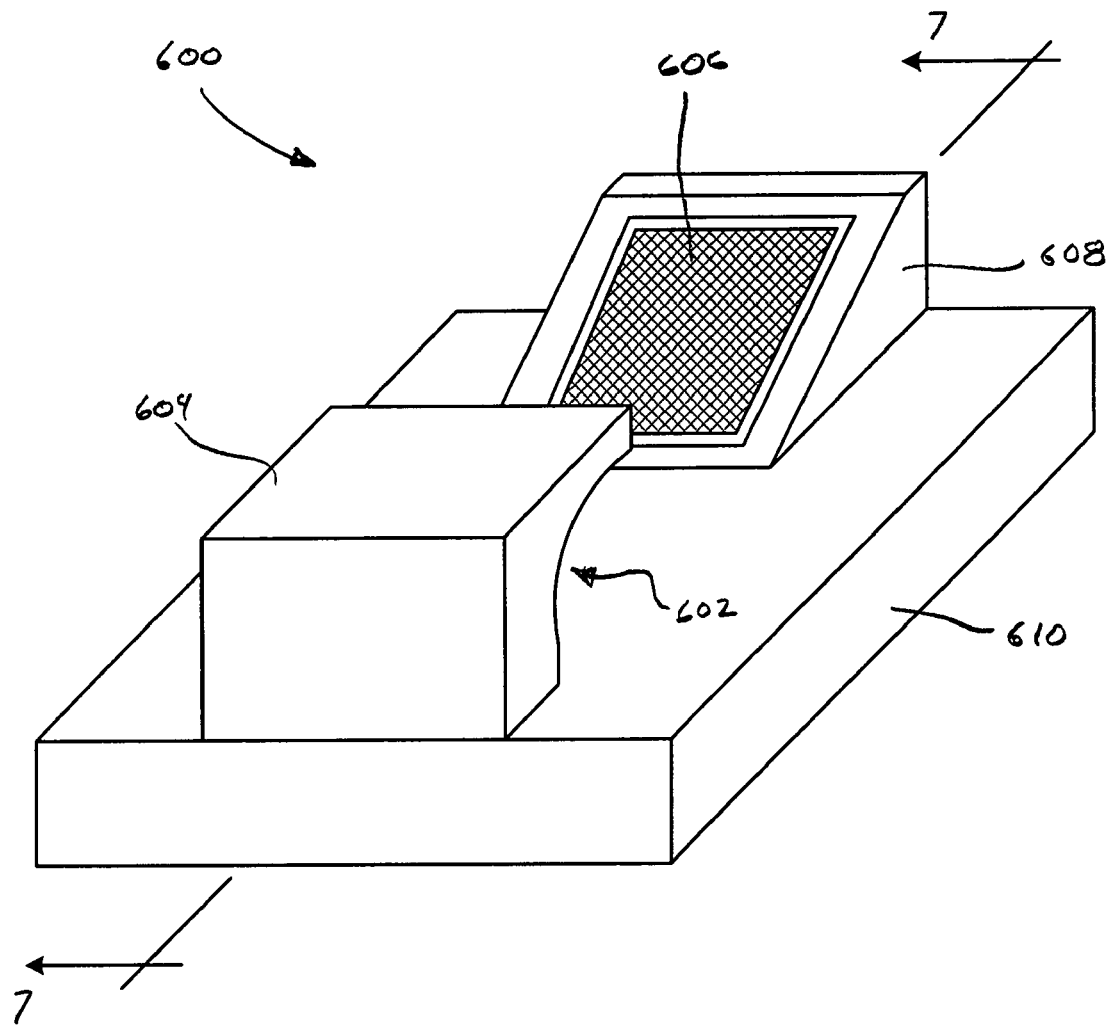
FIG. 6 shows an isometric view of a micro-electro-mechanical system in accordance with embodiments of the present invention.

FIG. 6 shows an isometric view of a MEMS 600 in accordance with embodiments of the present invention. MEMS 600 includes a membrane 602, a membrane-actuator system 604, a diffraction grating 606, and a grating-actuator system 608. MEMS 600 is supported by a computational device 610 that can be a node of a DCP or a node component. MEMS 600 can be electronically coupled to a system control that directs MEMS 600 to align and focus a data-carrying beam output from computational device 610 onto a photodetector of a receiver (not shown) located on a different computational device (not shown), as described above with reference to FIG. 5.

Figure 7:
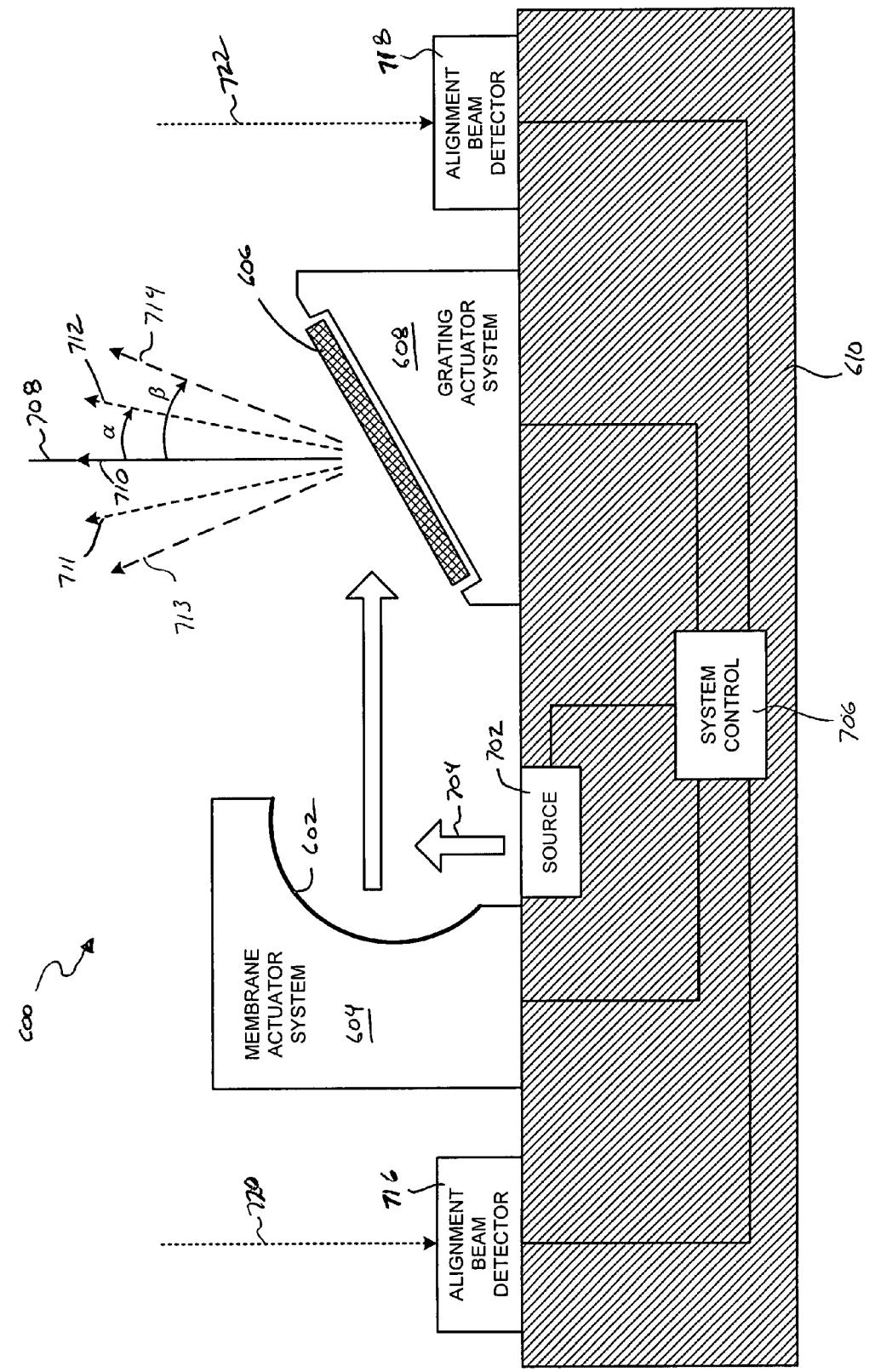
FIG. 7 shows a cross-sectional view of the micro-electro-mechanical system along a line 7-7, shown in FIG. 6, in accordance with embodiments of the present invention.

FIG. 7 shows a cross-sectional view of MEMS 600 along a line 7-7, shown in FIG. 6, in accordance with embodiments of the present invention. Membrane 602 has a flexible, concave surface that is operably coupled to membrane-actuator system 604, which is operable to change the curvature of membrane 602. Membrane-actuator system 604 embodiments of the present invention are described below with reference to FIG. 11. Membrane 602 may have a silvered surface that reflects electromagnetic radiation emitted from a source 702, or the surface of membrane 602 may be configured as a Bragg reflector that filters out electromagnetic radiation of particular wavelengths and reflects electromagnetic radiation of other wavelengths emitted from source 702. Source 702 can be a laser diode or a vertical-cavity surface emitting laser. Flexible concave mirrored membranes and membranes that operate as Bragg reflectors are well-known in the art. Diffraction grating 606 is operably coupled to grating-actuator system 608, which can change the amount of diffraction and/or orientation of the diffraction grating 606. Operation of grating-actuator system 608 and diffraction grating 606 embodiments of the present invention are described below with reference to FIGS. 12-16. Membrane-actuator system 604, grating-actuator system 608, and source 702 are electronically coupled to system control 706 that controls the operation of these devices.

In certain embodiments of the present invention, source 702 can emit a beam 704 of electromagnetic radiation encoding data generated by computational device 610. In other embodiments of the present invention, source 702 can emit a beam of electromagnetic radiation with a substantially continuous intensity. Diffraction grating 606 can be adjusted by grating-actuator system 608 under the control of system control 706 to encoded data in beam 704 by changing the grating or orientation of diffraction grating 606. Adjusting the diffracting grating 606 to either focus or encode data in a beam 704 is described below with reference to FIGS. 12 and 16

Figure 8:
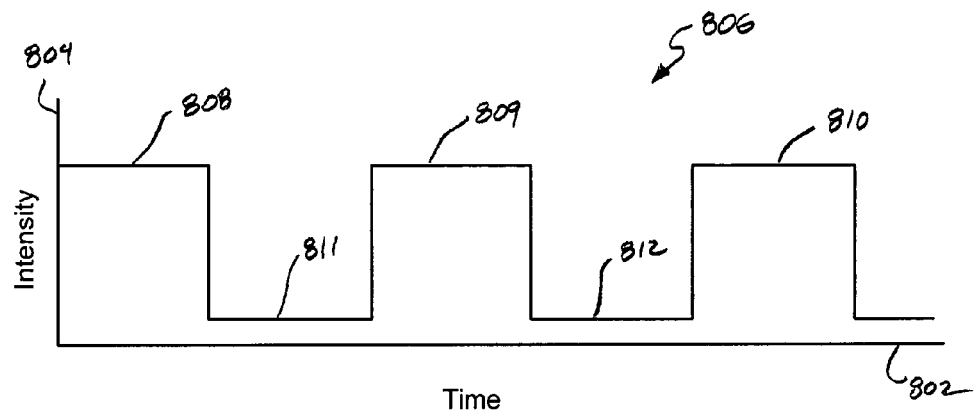
FIG. 8 is an intensity plot of data-encoded electromagnetic radiation versus time.

FIG. 8 is an example intensity plot of data-encoded electromagnetic radiation versus time. In FIG. 8, horizontal axis 802 represents time, and vertical axis 804 represents intensity. Square wave 806 represents intensity variations in a beam of electromagnetic radiation that correspond a binary data string "10101".Relatively high-intensity regions 808-810 represent the binary number "1," and relatively low-intensity regions 811 and 812 represent the binary number "0". Square wave 806 represents a data-carrying beam emitted by a MEMS in accordance with embodiments of the present invention.

Returning to FIG. 7, membrane-actuator system 604 controls the curvature of membrane 602 so that beam 704 is reflected off the surface of membrane 602 toward diffraction grating 606. Diffraction grating 606 is configured to separate beam 704 into a number of periodic diffracted beams, each of which is emitted from diffraction grating 606 at a different angle to a vector 708 that is approximately normal to the surface of computational device 610. Vectors 710-714 represent directions of five separate and periodic diffracted beams of electromagnetic radiation produced by diffraction grating 606. Beam 710 corresponds to a portion of beam 704 that is directed substantially parallel to vector 708. Beam 710 also corresponds to the data-carrying beams described above with reference to FIGS. 2-5. Beams 711 and 712 are portions of beam 704 that are directed at an angle α to vector 708, and beams 713 and 714 are portions of beam 704 that are directed at a relatively larger diffraction angle β to vector 708. Vector 708 is assumed to be directed to a photodetector located on another computational device or it can be directed to a mirror that directs the data-carrying beam to the photodetector located on another computational device.

Figure 9:
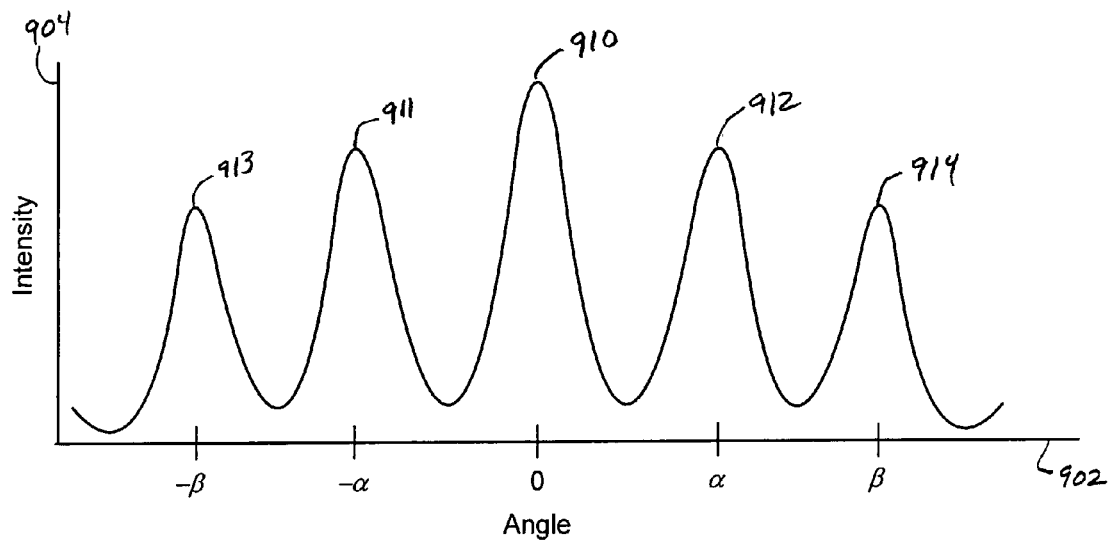
FIG. 9 is a plot of periodic intensities versus diffraction angles for five diffracted beams output from a diffraction grating.

FIG. 9 is a plot of periodic intensities versus diffraction angles for diffracted beams 710-714. Horizontal line 902 is a diffraction-angle axis, and vertical line 904 is an intensity axis. Intensity peaks 910-914 are separated by low-intensity regions. Highest intensity peak 910 corresponds to data-carrying beam 710, and relatively lower intensity peaks 911-914 correspond to beams 711-714, which can be used to dynamically align and focus data-carrying beam 710 as described below with reference to FIG. 10.

Two or more of beams 711-714, shown in FIG. 7, can be used as alignment beams that are reflected back to photodetectors 716 and 718 that are located on opposite sides of MEMS 600. Photodetectors 716 and 718 are positioned relative to reflectors located on a receiver (not shown) and detect reflected alignment beams 720 and 722, respectively. Photodetectors 716 and 718 are also in electrical communication with system control 706 that coordinates operation of source 702, membrane-actuator system 604, and grating-actuator system 608 based on detection events at photodetectors 716 and 718.

Figure 10A:
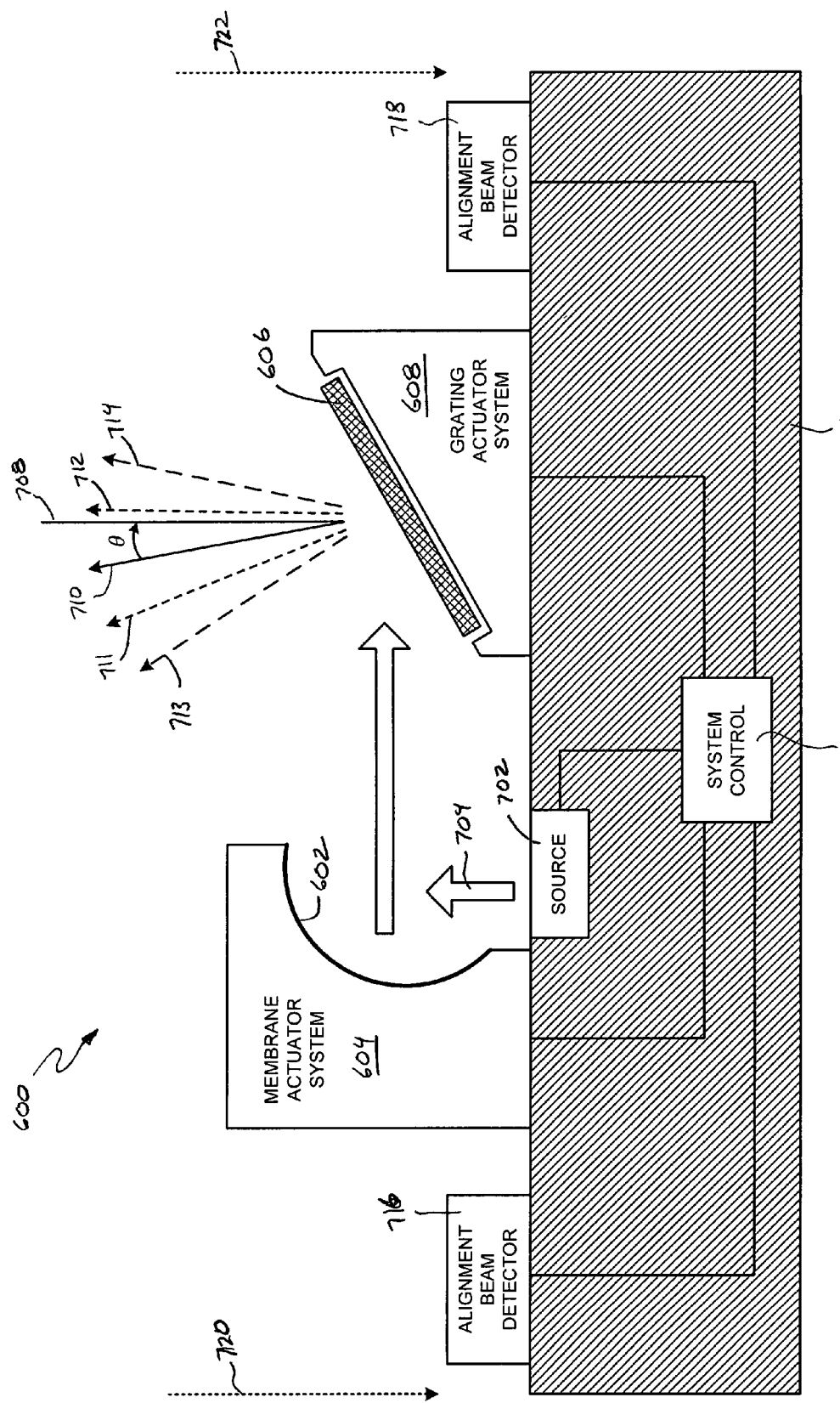
FIGS. 10A-10B show dynamic alignment and focusing of a data-carrying beam of electromagnetic radiation using the micro-electro-mechanical system shown in FIG. 7 in accordance with embodiments of the present invention.
Figure 10B:
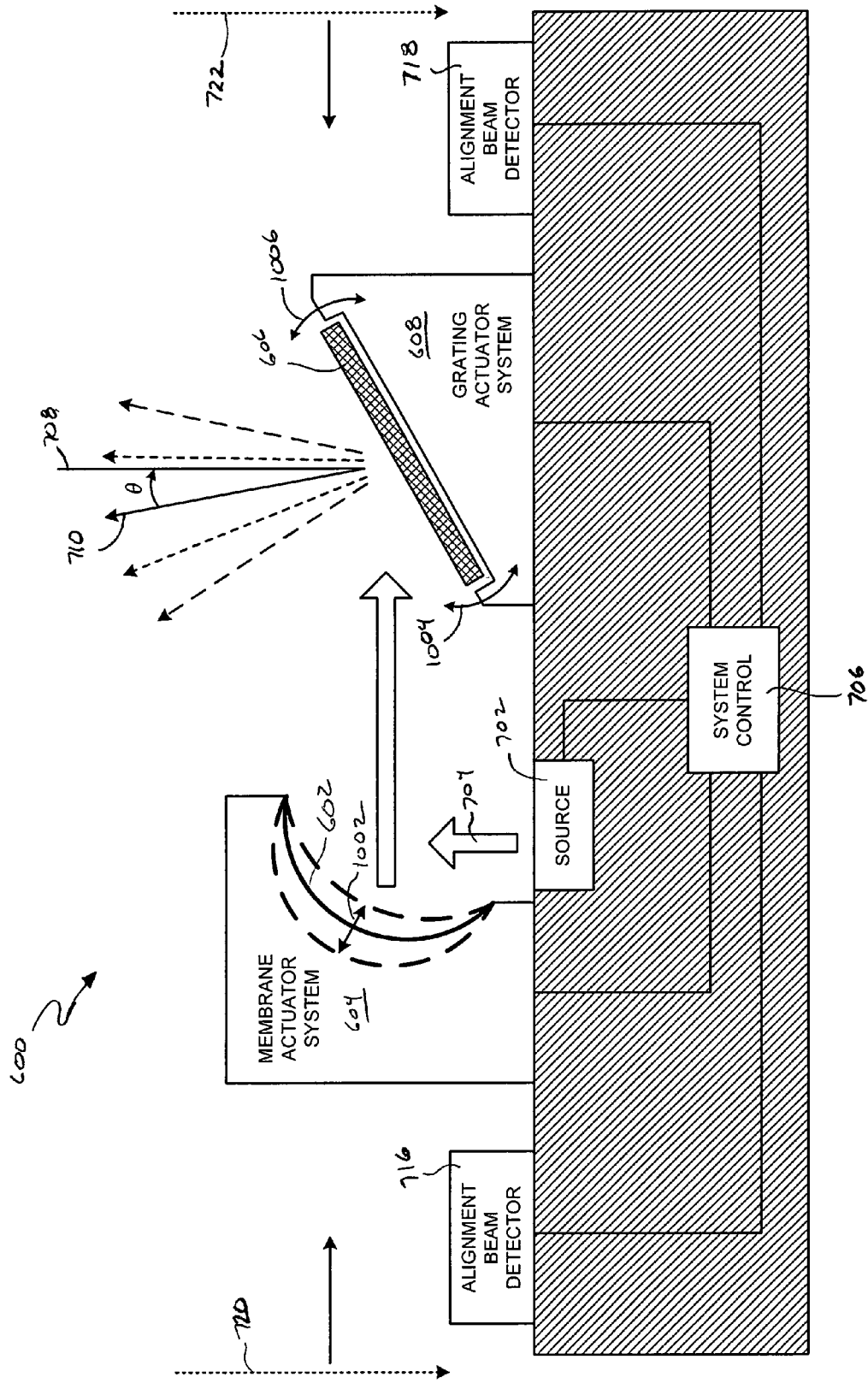

Embodiments of the present invention include dynamic alignment and focusing of a data-carrying beam onto a photodetector located on a different computational device. Dynamic alignment and focusing can be performed just before data transmission begins or it can be performed periodically during data transmission in an effort to reduce data-transmission interruptions due to perturbations such as vibrations. For example, system control 706 may be configured to recognize that data-carrying beam 710 is not aligned with a photodetector when reflected alignment beams 720 and 722 are not simultaneously detected by photodetectors 716 and 718. System control 706 may then interrupt data transmission and direct source 702 to emit a non-data encoded beam 704 in order to dynamically align and focus data-carrying beam 710. In one embodiment of the present invention, dynamic alignment and focusing can be accomplished as follows. As shown in FIG. 10A, system control 706 directs source 702 to emit beam 704. MEMS 600 subsequently produces data-carrying beam 710 that is not aligned with vector 708 by a diffraction angle θ and alignment beams 711-714 that are not aligned with reflectors located on a receiver (not shown). As a result, reflected alignment beams 720 and 722 that are transmitted back to computational device 610 do not line up with photodetectors 716 and 718. Next, as shown in FIG. 10B, because system control 706 does not receive signals indicating detection of one or both of the alignment beams 720 and 722, system control 706 directs membrane-actuator system 604 and grating-actuator system 608 to correspondingly change the curvature of membrane 602 and change the orientation of diffraction grating 606, as indicated by directional arrows 1002, 1004, and 1006, so that data-carrying beam 710 is aligned with vector 708.

Figure 11C:
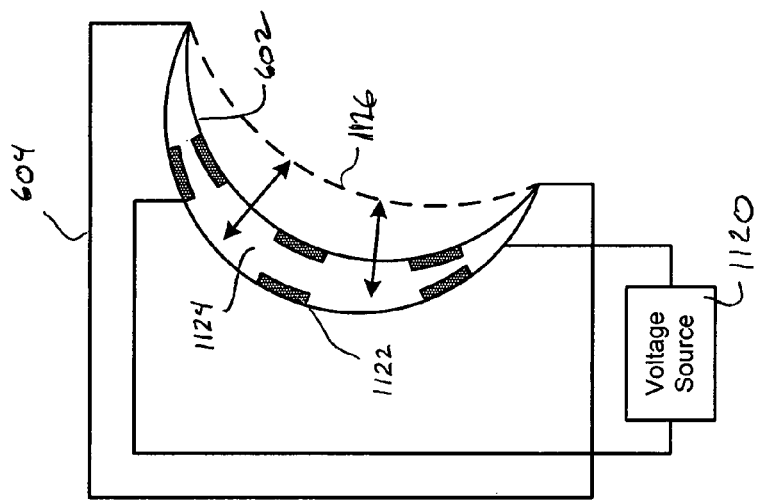
FIGS. 11A-11C show three membrane-actuator systems, each of which represents an embodiment of the present invention.
Figure 11B:
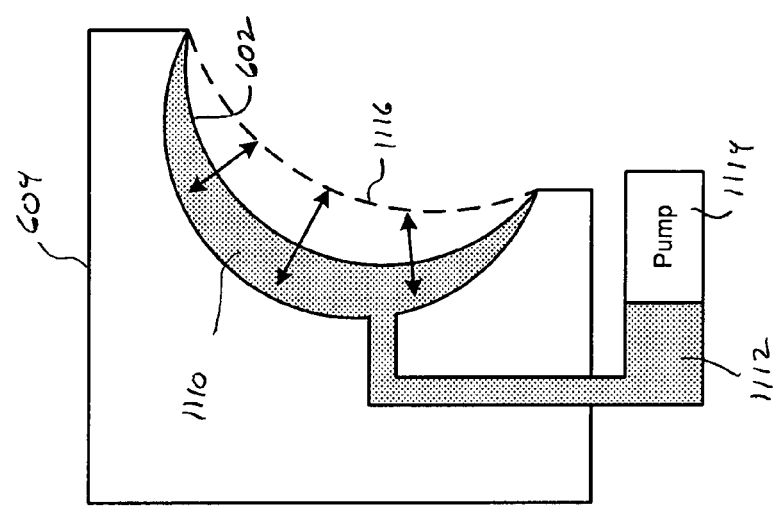
Figure 11A:
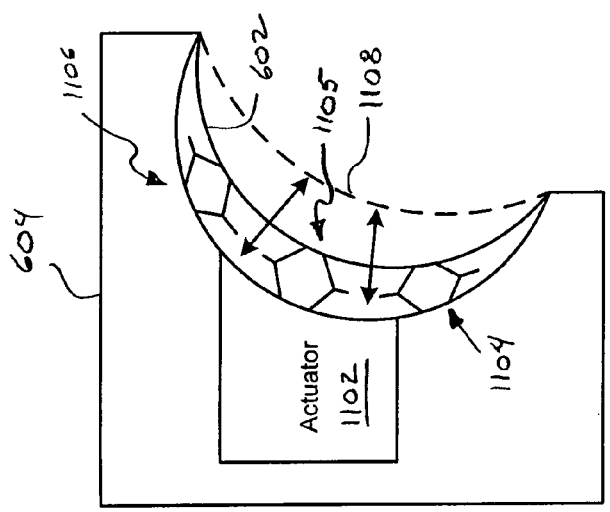

A number of different membrane-actuator systems can be used to dynamically change the curvature of membrane 602. FIGS. 11A-11C show three different membrane-actuator systems, each of which represents an embodiment of the present invention. In FIG. 11A, membrane 602 is coupled to an actuator 1102 via biasing or spring elements 1104-1106, such as flexures, which are well-known in the art. Actuator 1102 controls the curvature of membrane 602 by exerting or reducing forces on biasing elements 1104-1106, which, in turn, push or pull membrane 602 into a different curvature, such as larger curvature 1108. In FIG. 11B, membrane 602 is fluidly coupled to a first reservoir 1110. As shown in FIG. 11B, first reservoir 1110 is fluidly coupled to a second reservoir 1112 holding the same fluid that is fluidly coupled to a pump 1114. Pump 1114 can be a piezoelectric pump that exerts pressure on the fluid in second reservoir 1112, which, in turn, push or pull membrane 602 into a different configuration, such as larger curvature configuration 1116. In FIG. 11C, membrane 602 is electronic coupled to a voltage source 1120 via electrodes, such as electrode 1122, located on the non-reflective surface of membrane 602 and on the opposing surface of chamber 1124. Voltage source 1120 supplies a voltage that generates electrostatic repulsive or attractive forces between opposing electrodes, which push or pull membrane 602 into a different configuration with a different curvature, such as larger curvature configuration 1126. In other embodiments of the present invention, voltage source 1120 supplies a voltage that generates magnetostatic repulsive or attractive forces between opposing electrodes.

Figure 12:
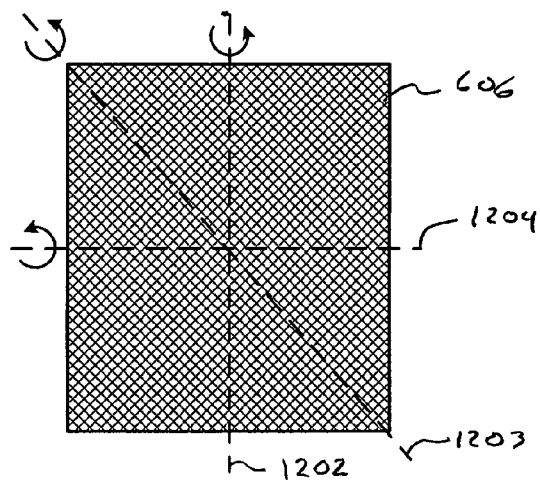
FIG. 12 shows three rotational axes about which the diffraction grating, shown in FIG. 6, can rotate in accordance with embodiments of the present invention.

Diffraction grating 606 can be coupled to grating-actuator structure 608 using torsion supports, such as torsion springs or torsion bars, located along the top, bottom and sides of diffraction grating 606. Torsion supports attached to devices are well-known in the art. Electrodes can be placed on opposing surfaces of diffraction grating 606 and grating-actuator system 608 so that when appropriate voltages are applied to the electrodes, electrostatic or magnetostatic repulsive or attractive forces can be used to change the orientation of the diffracting grating 606 relative to the fixed position of the grating-actuator system 608. FIG. 12 shows three different rotational axes 1202-1204 about which diffraction grating 606 can be rotated in accordance with embodiments of the present invention. For example, repulsive electrostatic forces applied to a lower portion of diffraction grating 606 causes diffraction grating 606 to rotate about axis 1204, repulsive electrostatic forces applied to the lower left-hand portion of diffraction grating 606 causes diffraction grating 606 to rotate about axis 1203, and repulsive electrostatic forces applied to the right-hand portion of diffraction grating 606 causes diffraction grating 606 to rotate about axis 1202.

Figure 13A:
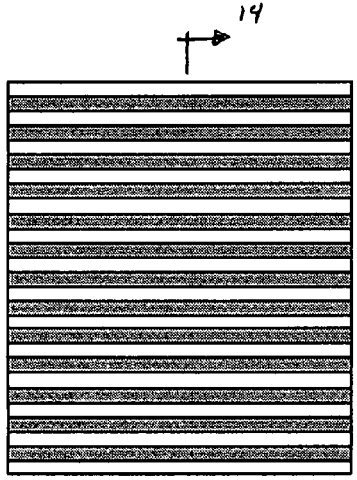
FIGS. 13A-13B show substantially periodic elements of two diffraction gratings, each of which represents an embodiment of the present invention.
Figure 13B:
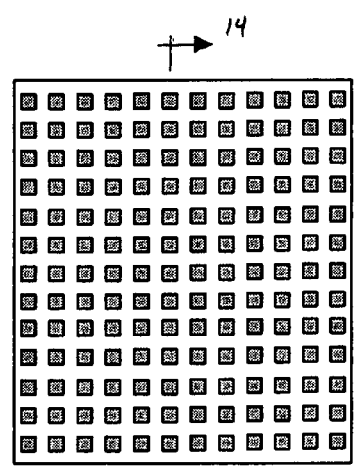
Figure 14A:
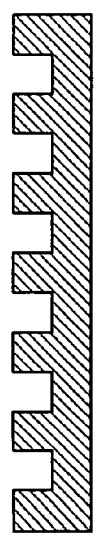
FIGS. 14A-14C show cross-sectional views of three kinds of diffraction elements along a line 14-14, shown in FIG. 13, in accordance with embodiments of the present invention.
Figure 14B:
Figure 14C:

A number of different kinds of diffraction elements can be used to form diffraction grating 606, which are well-known in the art. The size, arrangement and type of diffraction elements selected for diffraction grating 606 depends on the number and arrangement of alignment beams needed and on the wavelength of the electromagnetic radiation emitted from the source. Methods for selecting the size, arrangement, and type of diffraction elements based on the wavelength and number of diffracted beams emitted from a diffraction grating is well-known in the art. FIG. 13A shows alternating patterns of substantially periodically spaced, linear diffraction elements in accordance with embodiments of the present invention. FIG. 13B shows a grid of substantially regularly spaced rectangular diffraction elements in accordance with embodiments of the present invention. FIGS. 14A-14C show three cross-section views of different kinds of diffraction elements along line 14-14, shown in FIG. 13, in accordance with embodiments of the present invention. FIG. 14A shows a cross-section view of rectangular-shaped diffraction elements. FIG. 14B shows a cross-section view of rounded grooves that form spacings between diffraction elements. FIG. 14C shows a cross-sectional view of blazed diffraction elements.

Figure 15:
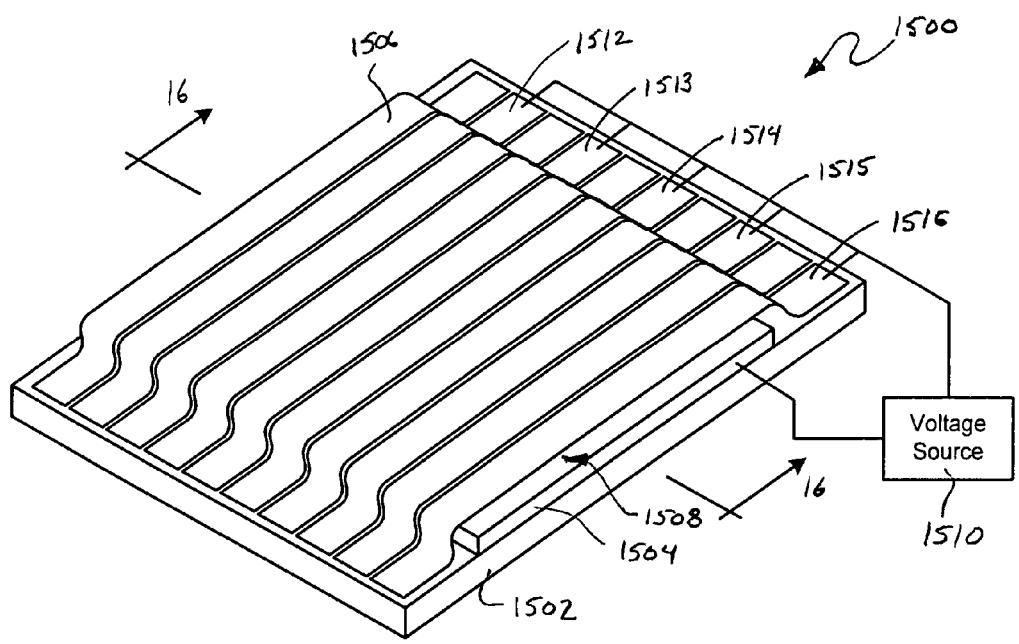
FIG. 15 shows an isometric view of a grating light valve in accordance with embodiments of the present invention.

FIG. 15 shows an isometric view of a grating light valve 1500 in accordance with embodiments of the present invention. Grating light valve ("GLV") 1500 is a micromechanical phase grating that can be used as diffraction grating 606. GLV 1500 includes a substrate 1502, a bottom electrode 1504, and ten ribbons, such as ribbon 1506. When the ribbons are undisturbed, an air gap 1508 exists between the ribbons and electrode 1504. A voltage source 1510 is coupled to alternate ribbons 1512-1516 and to bottom electrode 1504. In certain embodiments of the present invention, substrate 1502 can be composed of an intermediate layer of oxide sandwiched between a top of layer of Tungsten and a bottom layer of Silicon. The ribbons can be composed of a reflective top layer, such as Aluminum, deposited on a bottom layer of nitride or another suitable material. The Aluminum layer serves as a reflective surface. For a general description of Grating Light Valves see "The Grating Light Valve: revolutionizing display technology," by D. M. Bloom, Proc. SPIE Vol. 3013, p. 165-171, *Projection Displays III*, May 1997, Ming H. Wu; Ed. In other embodiments of the present invention, the width and number of ribbons can be varied depending on the wavelength of electromagnetic radiation emitted by source 702 and on the number of alignment beams needed.

Figure 16A:
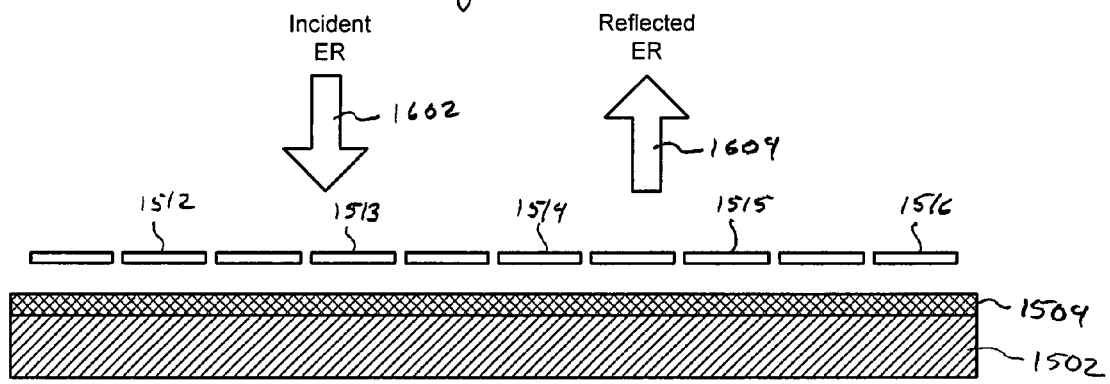
FIGS. 16A-16B show cross-sectional views of the grating light valve along a line 16-16, shown in FIG. 15, and using the grating light valve as a reflector and diffraction grating in accordance with embodiments of the present invention.
Figure 16B:
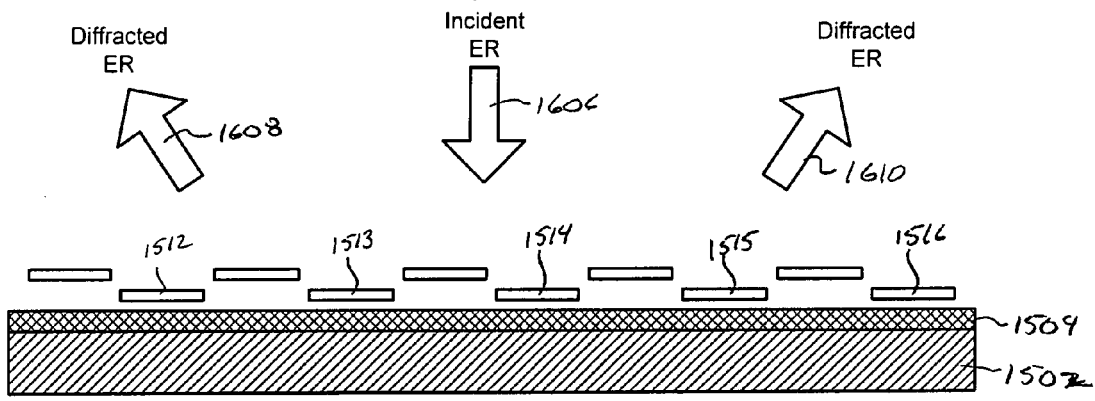

GLV 1500 can be operated as diffraction grating 606 by pulling down on the alternate ribbons 1512-1516 using electrostatic forces created by applying an appropriate voltage to alternating ribbons 1512-1516 and electrode 1504. FIGS. 16A-16B show cross-sectional views of a GLV 1500 along line 16-16, shown in FIG. 15, and using GLV 1500 as a reflector and diffraction grating in accordance with embodiments of the present invention. In FIG. 16A, when no voltage is applied to alternating ribbons 1512-1516 and electrode 1504, the ribbons assume a natural "up" position. This natural "up" position is maintained by the tensile stress of the ribbon material. When all of the ribbons lie in the same plane, incident electromagnetic radiation 1602 is reflected 1604 from the outer surfaces of the ribbons. However, as shown in FIG. 16B, when an appropriate voltage is applied to alternate ribbons 1512-1516 and to electrode 1504, electrostatic forces pull alternate ribbons 1512-1516 down toward electrode 1504 to form diffraction grating 606. An incident beam of electromagnetic radiation 1606 is diffracted to produce separate periodic diffracted beams of electromagnetic radiation 1608 and 1610. In certain embodiments of the present invention, by rapidly switching an appropriate voltage "ON" and "OFF," GVL 1500 can be used to encode data in electromagnetic radiation with a substantially continuous intensity, as described above with reference to FIG. 7.

Figure 17A:
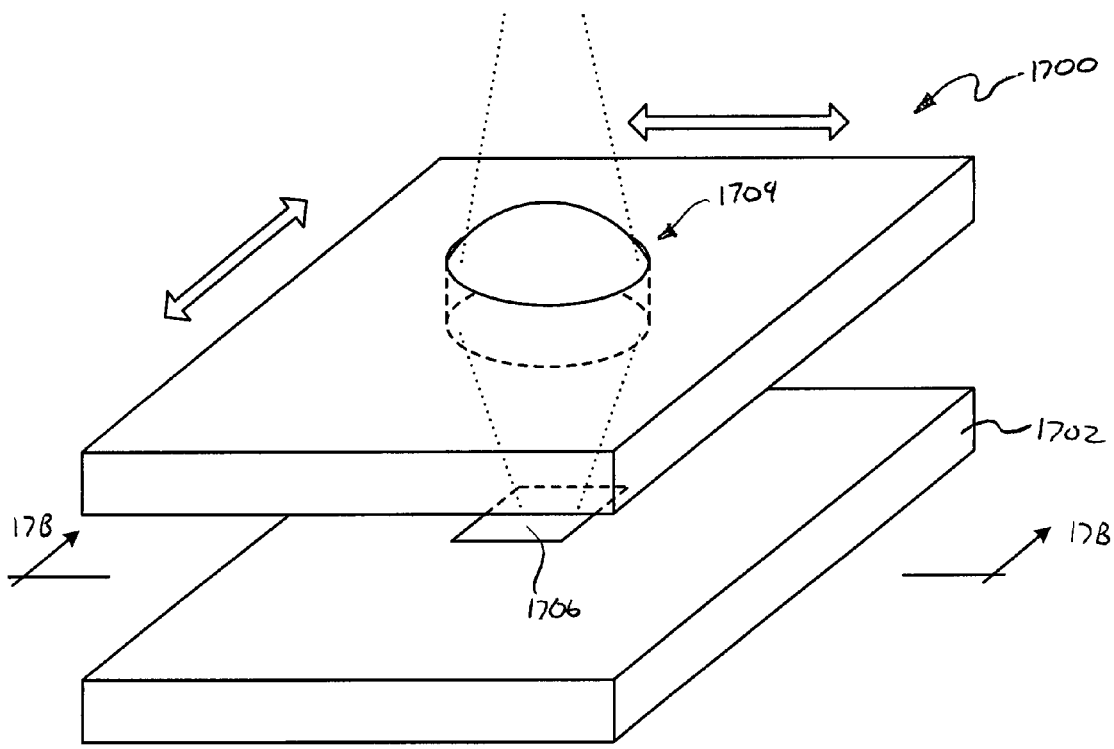
FIGS. 17A-17B show a micro-electro-mechanical system of a photonic interconnect in accordance with an embodiment of the present invention.

FIG. 17A shows an isometric view of a MEMS 1700 portion of a photonic interconnect in accordance with embodiments of the present invention. In FIG. 17A MEMS 1700 is suspended above a portion of a node 1702. MEMS 1700 includes a lens structure 1704, described in more detail below with reference to FIG. 17B, that focuses a beam emitted from a source 1706 in node 1702. Source 1706 can be a laser diode or vertical-cavity surface emitting laser. MEMS 1700 is attached to a motor (not shown) that is operable to laterally adjust the position of MEMS 1700 and to direct a data-carrying beam emitted from lens structure 1704 onto a photodetector located on a second node (not shown).

Figure 17B:
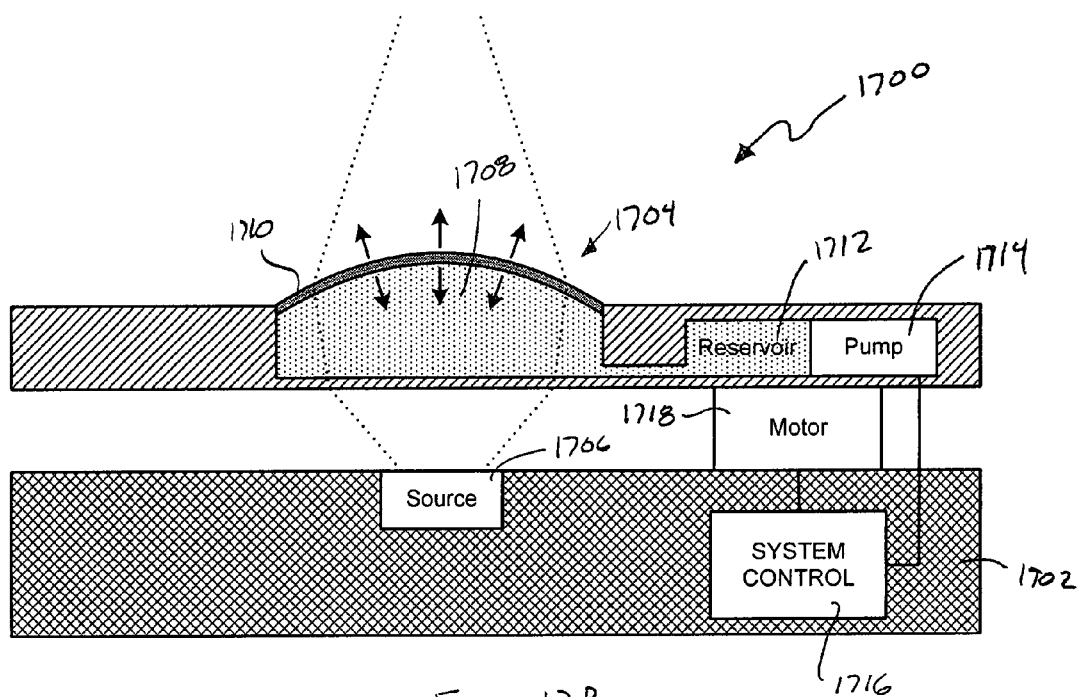

FIG. 17B shows a cross-sectional view of MEMS 1700 and node 1702 along a line 17B-17B, shown in FIG. 17A, in accordance with embodiments of the present invention. Len structure 1704 includes a first reservoir 1708 holding a fluid that is fluidly coupled to a membrane 1710. The fluid can be a transparent liquid and membrane 1710 can be a thin transparent flexible material, such as Silicon, $Si_3N_4$, $SiO_2$, or some other suitable flexible transparent material. The first reservoir 1708 is fluidly coupled to a second reservoir 1712 that is operably coupled to a pump 1714. A system control 1716 is electronically coupled to a motor 1718 and pump 1714 in order to dynamically align and focus a data-carrying beam emitted from source 1706 and transmitted through lens structure 1704 onto a photodetector (not shown) located on a second node. Motor 1718 is operable to laterally reposition MEMS 1700 and align the data-carrying beam with the photodetector. Pump 1714 exerts or reduces pressure on second reservoir 1712, which, in turn, exerts or reduces pressure on the fluid in reservoir 1708 to change the curvature of membrane 1710 and focus the data-carrying beam onto the photodetector. Pump 1714 can be piezoelectric pump.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A micro-electro-mechanical system comprising:
   a membrane having a flexible concave surface to reflect a beam of electromagnetic radiation;
   a diffraction grating to separate the beam of electromagnetic radiation reflected from the membrane into one or more beams of electromagnetic radiation;
   a membrane-actuator system coupled to the membrane, the membrane-actuator system to change the curvature of the membrane and direct the beam of electromagnetic radiation onto the diffraction grating; and
   a grating-actuator system coupled to the diffraction grating, the grating-actuator system to change the orientation of the diffraction grating to control the direction of the one or more separate alternating beams of electromagnetic radiation.

2. The system of claim 1 wherein the diffraction grating further comprises one of:
   a surface having a one-dimensional array of diffraction elements;
   a surface having a two-dimensional array of diffracting elements; and
   a grating light valve.

3. The system of claim 1 wherein the diffraction elements further comprise one of:
   ridge diffraction elements;
   blazed diffraction elements; and
   rounded diffraction elements.

4. The system of claim 1 wherein the beam of electromagnetic radiation is emitted from a vertical-cavity surface emitting laser.

5. The system of claim 1 wherein the membrane further comprises one of:
   a concave Bragg mirror; and
   a concave silvered membrane.

6. The system of claim 1 wherein the membrane-actuator system further comprises a pump and a reservoir fluidly coupled to the membrane, the pump to exert pressure on a fluid stored in the reservoir to change the curvature of the membrane and the direction of the beam of electromagnetic radiation.

7. The system of claim 1 wherein the membrane-actuator system further comprises a pump and flexures coupled to the membrane, the pump to exert pressure on the flexures to change the curvature of the membrane and the direction of the beam of electromagnetic radiation.

8. The system of claim 1 wherein the membrane-actuator system further comprises a voltage source and electrodes located on a side of the membrane opposite the reflective surface of the membrane, the voltage source to bias the electrodes to create a repulsive electrostatic force to change the curvature of the membrane and the direction of the beam of electromagnetic radiation.

9. A photonic interconnect for transmitting electromagnetic radiation from a first computational device to a second computational device, the photonic interconnect comprising:
   a micro-electro-mechanical system positioned on the first computational device to direct a data-carrying beam of electromagnetic radiation and two or more alignment beams of electromagnetic radiation to the second computational device, the micro-electroc-mechanical system including:
      a membrane having a flexible, concave surface to reflect a beam of electromagnetic radiation;
      a diffraction grating to separate the beam of electromagnetic radiation reflected from the membrane into the data-carrying beam and the one or more alignment beams;
      a membrane-actuator system coupled to the membrane, the membrane-actuator system to change the curvature of the membrane and direct the beams onto the diffraction grating; and
      a grating-actuator system coupled to the diffraction grating, the grating-actuator system to change the orientation of the diffraction grating to control the direction of the beams;
   a receiver system electronically coupled to the second computational device to detect the data-carrying beam of electromagnetic radiation and reflect the two or more alignment beams of electromagnetic radiation back to the first computational device; and
   a system control electronically coupled to the micro-electro-mechanical system, the system control to align and focus the data-carrying beam of electromagnetic radiation onto the receiver based on detection of the two or more alignment beams of electromagnetic radiation reflected back to the first computational device.

10. The photonic interconnect of claim 9 wherein the receiver system further comprises:
   a photodetector to detect the data-carrying beam of electromagnetic radiation; and
   two or more reflective surfaces to reflect the alignment beams of electromagnetic radiation back to the second computational device.

11. The photonic interconnect of claim 9 wherein the first computational device further comprises two or more photodetectors electronic coupled to the system control to correspondingly detect the two or more alignment beams of electromagnetic radiation reflected back to the first computational device.

12. The photonic interconnect of claim 9 wherein the second computational device includes a motor, the motor operable to move the receiver to intercept the data-carrying beam of electromagnetic radiation.

* * * * *

UNITED STATES PATENT AND TRADEMARK OFFICE
CERTIFICATE OF CORRECTION

PATENT NO. : 8,054,531 B2  
APPLICATION NO. : 11/823336  
DATED : November 8, 2011  
INVENTOR(S) : Shih-Yuan Wang et al.

Page 1 of 1

It is certified that error appears in the above-identified patent and that said Letters Patent is hereby corrected as shown below:

In column 11, line 16, in Claim 9, delete "micro-electroc-mechanical" and insert -- micro-electro-mechanical --, therefor.

Signed and Sealed this
Fourteenth Day of August, 2012

David J. Kappos
*Director of the United States Patent and Trademark Office*